(12) United States Patent
Liou et al.

(10) Patent No.: US 10,458,534 B1
(45) Date of Patent: Oct. 29, 2019

(54) GEARBOX SYSTEM WITH ADD-ON COOLING FIN PANELS

(71) Applicant: ABB Schweiz AG, Baden (CH)

(72) Inventors: Joe J. Liou, Windsor, CT (US); Stefan Rakuff, Windsor, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/994,562

(22) Filed: May 31, 2018

(51) Int. Cl.
 *F16H 57/04* (2010.01)
 *F16H 57/031* (2012.01)
 *F16H 57/02* (2012.01)

(52) U.S. Cl.
 CPC ....... *F16H 57/0416* (2013.01); *F16H 57/031* (2013.01); *F16H 2057/02017* (2013.01)

(58) Field of Classification Search
 CPC .... F16H 57/03; F16H 57/031; F16H 57/0412; F16H 57/0415; F16H 57/0416; F16H 2057/02017; F28F 3/12; F28F 2013/005; F28F 2013/006; F01P 2070/52; F28D 2021/004; F28D 2021/0049
 See application file for complete search history.

(56) References Cited

U.S. PATENT DOCUMENTS

| | | | | |
|---|---|---|---|---|
| 1,991,618 A | * | 2/1935 | Lyman | F01M 5/002 165/183 |
| 2,583,751 A | * | 1/1952 | Schmitter | F16H 57/0493 184/104.1 |
| 3,476,177 A | * | 11/1969 | Potzl | H01J 19/36 165/186 |
| 3,550,678 A | * | 12/1970 | Pfouts | B64D 33/10 165/165 |
| 4,022,272 A | * | 5/1977 | Miller | F01P 11/08 123/196 AB |
| 5,193,415 A | * | 3/1993 | Massel | B60K 17/08 180/346 |
| 5,816,320 A | * | 10/1998 | Arnold | F28D 1/0535 165/152 |
| 6,415,855 B2 | * | 7/2002 | Gerard | F25J 5/002 165/166 |
| 6,425,293 B1 | * | 7/2002 | Woodroffe | G01F 23/0076 73/708 |

(Continued)

FOREIGN PATENT DOCUMENTS

| | | | | |
|---|---|---|---|---|
| DE | 102004022863 A1 | * | 12/2005 | ......... F16H 57/0415 |
| JP | 3757765 B2 | * | 3/2006 | ......... F16H 57/0415 |
| WO | WO-9104427 A1 | * | 4/1991 | ......... F16H 57/0415 |

OTHER PUBLICATIONS

Machine translation of DE 102004022863 A1 obtained on Oct. 31, 2018.*

*Primary Examiner* — Adam D Rogers
(74) *Attorney, Agent, or Firm* — Taft Stettinius & Hollister LLP; J. Bruce Schelkopf

(57) ABSTRACT

A gearbox system includes a gearbox having a housing. The housing includes a surface. The gearbox system also includes an add-on cooling fin panel in thermal engagement with the surface. The cooling fin panel includes a plurality of cooling fins. The gearbox system further includes an attachment feature constructed to affix the cooling fin panel to the gearbox. The cooling fin panel is constructed to transfer heat from the surface to the cooling fin panel by conduction; and the cooling fin panel is configured to transfer heat to an environment in which the gearbox is located by convection.

19 Claims, 7 Drawing Sheets

(56) References Cited

U.S. PATENT DOCUMENTS

| | | | | |
|---|---|---|---|---|
| 6,691,831 B1* | 2/2004 | Furuya | ................ | F01M 5/002 |
| | | | | 123/196 AB |
| 6,919,504 B2* | 7/2005 | McCutcheon | ...... | F28D 15/0241 |
| | | | | 174/16.3 |
| 8,410,350 B2* | 4/2013 | Corrales | ................ | H02S 40/42 |
| | | | | 136/244 |
| 8,833,193 B2* | 9/2014 | Straubeta | ............ | F16H 57/0447 |
| | | | | 184/6.12 |
| 8,967,334 B2* | 3/2015 | Straubeta | ............ | F16H 57/0447 |
| | | | | 184/6.12 |
| 8,973,458 B2* | 3/2015 | Straubeta | ............ | F16H 57/0447 |
| | | | | 184/6.12 |
| 9,062,754 B2* | 6/2015 | Straubeta | ............ | F16H 57/0447 |
| 9,599,406 B2* | 3/2017 | Tietyen | ................ | F28D 1/024 |
| 9,756,759 B2* | 9/2017 | Kimura | ............... | F16H 57/0416 |
| 9,951,859 B2* | 4/2018 | Becka | ................ | F16H 57/031 |
| 10,058,008 B2* | 8/2018 | Yang | ................ | F28F 3/048 |
| 10,260,817 B2* | 4/2019 | Fetzer | ................ | F28D 9/005 |
| 2005/0151554 A1* | 7/2005 | Rae | ................ | H01L 23/36 |
| | | | | 324/750.03 |
| 2015/0289850 A1* | 10/2015 | Lewis | ................ | A61B 8/546 |
| | | | | 600/459 |
| 2018/0299210 A1* | 10/2018 | Ronacher | ................ | F28F 3/025 |

\* cited by examiner

GEARBOX SYSTEM WITH ADD-ON COOLING FIN PANELS

TECHNICAL FIELD

The present application relates generally to gearbox systems, and more particularly, but not exclusively, to gearbox systems having cooling fins.

BACKGROUND

Gearbox systems remain an area of interest. Some existing systems have various shortcomings, drawbacks and disadvantages relative to certain applications. For example, in some gearbox system configurations, the power density of the gearbox may be improved. Accordingly, there remains a need for further contributions in this area of technology.

SUMMARY

One embodiment of the present invention is a unique gearbox system having add-on cooling fin panels. Other embodiments include apparatuses, systems, devices, hardware, methods, and combinations for gearbox systems and cooling fin panels. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
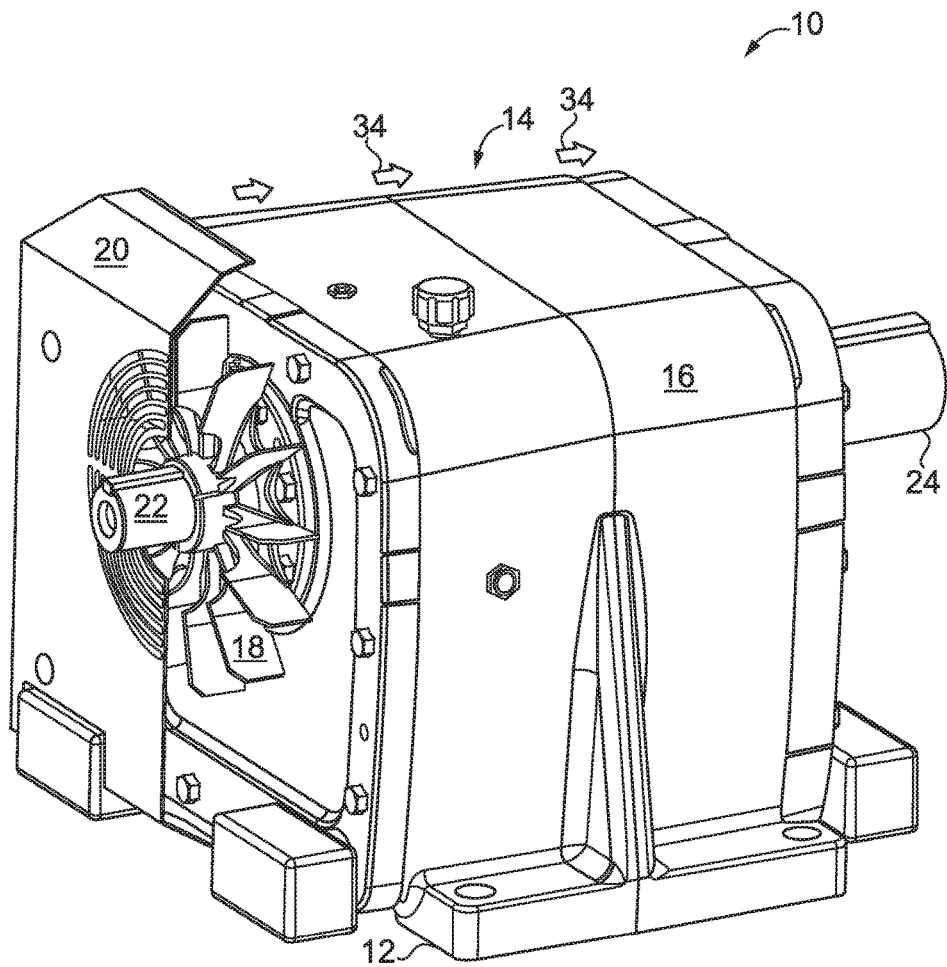
FIG. 1 depicts a perspective view illustrating some aspects of a non-limiting example of a gearbox system in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
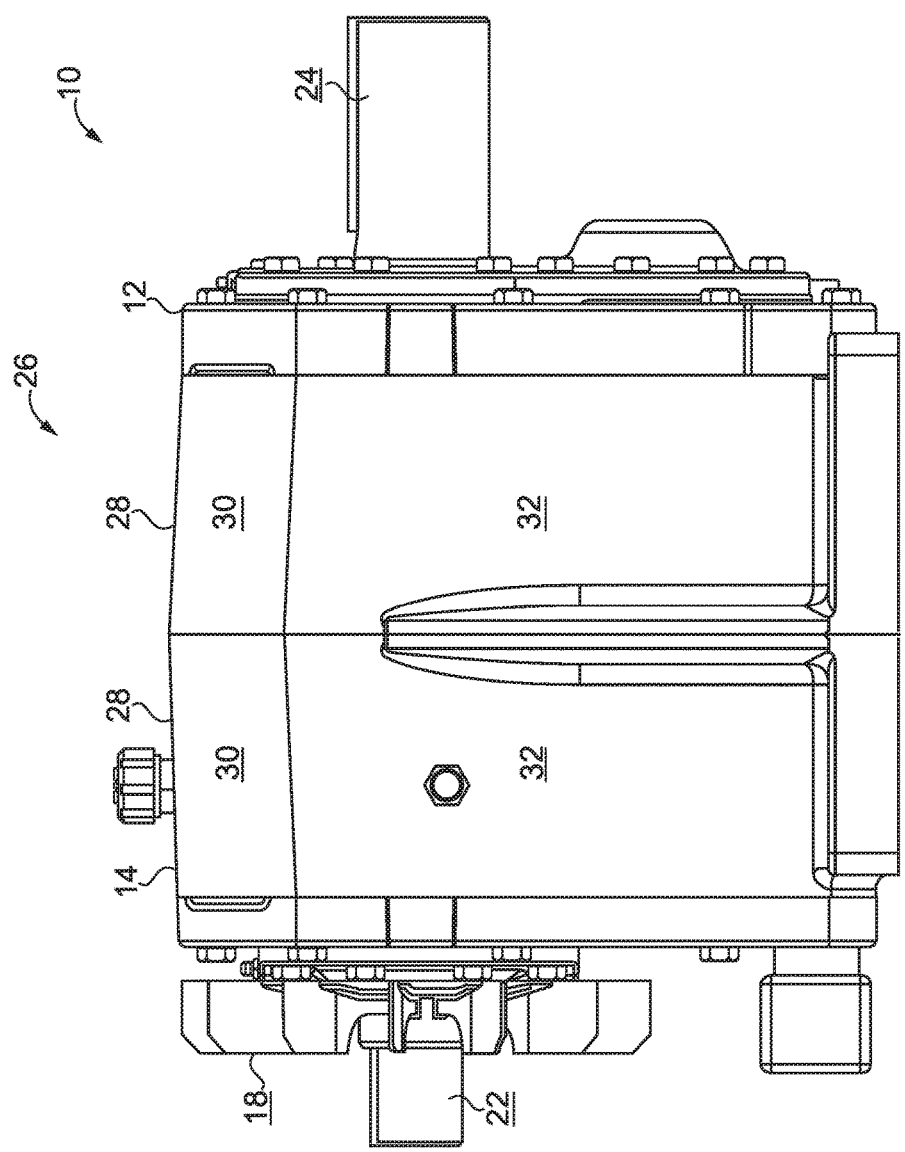
FIG. 2 illustrates a side view of the gearbox system of FIG. 1 in accordance with an embodiment of the present invention.
Figure 3:
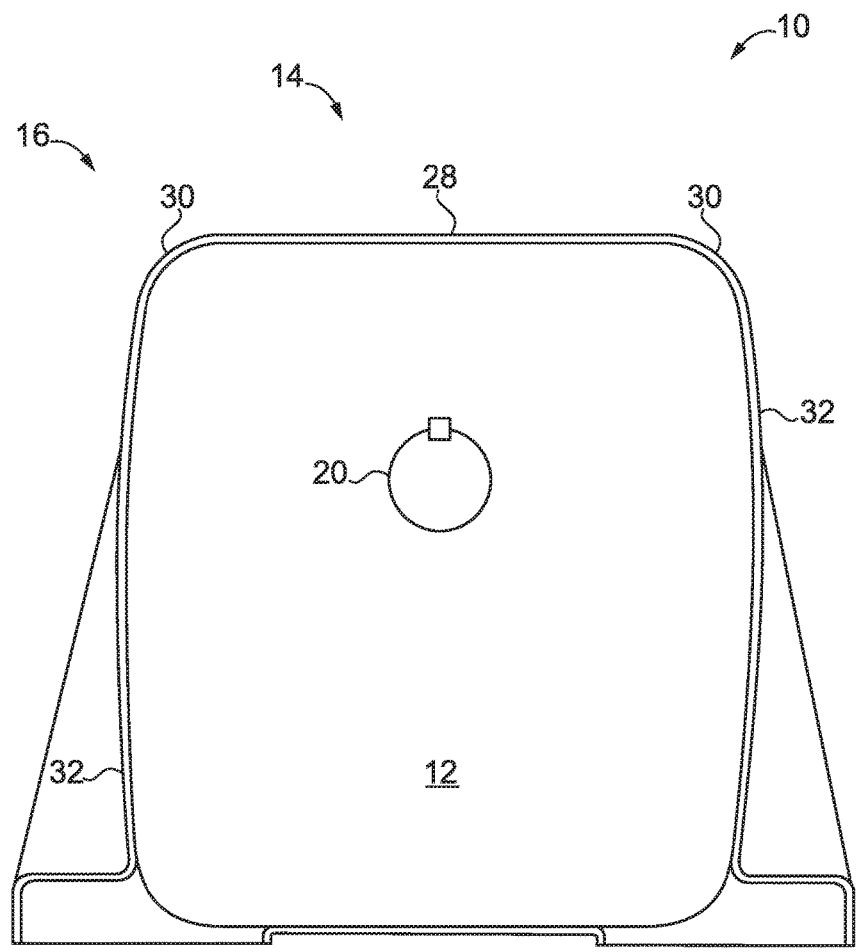
FIG. 3 schematically illustrates an end view of the gearbox system of FIG. 1 in accordance with an embodiment of the present invention.

Referring to FIGS. 1-3, some aspects of a non-limiting example of a gearbox system 10 accordance with an embodiment of the present invention are illustrated. Gearbox system 10 includes a gearbox 12. In one form, gearbox 12 is a gear reducer, i.e., a speed-reducing gearbox. In other embodiments, gearbox 12 may be a speed-increasing gearbox. In yet other embodiments gearbox 12 may be another type of gearbox. Gearbox 12 includes a housing 14 having external surface 16, a fan or impeller 18, a shroud 20, an input shaft 22 and an output shaft 24. In one form, housing 14 is a cast housing, e.g., a cast iron housing. In other embodiments, housing 14 may be an aluminum or other casting. In some embodiments, housing 14 may be a machined or welded housing.

External surface 16 is employed for extracting heat from gearbox 12 through housing 14, i.e., for cooling gearbox 12. External surface 16 has a contoured shape 26. Contoured shape 26 includes a plurality of flat portions 28, a plurality of curved portions 30, and a plurality of curved portions 32. Curved portions 32 are more gently curved than curved portions 30.

Fan or impeller 18 is coupled to input shaft 22, and is constructed to generate a cooling airflow 34. Fan or impeller 18 may be, for example, a radial or centrifugal fan and/or an axial fan, or an impeller. Shroud 20 is constructed to direct cooling airflow 34 from fan or impeller 18 over external surface 16, and over and/or through a plurality of cooling fins 38 (described below).

Gear reducers and other types of gearboxes may be thermally limited, due to internal power losses (e.g., gear churning, mesh, and bearing drag losses). The internal power losses generate heat, which drives up the temperature of the gearbox, which may adversely affect the life of the gearbox under some conditions, and which may limit the power density of the gearbox. In order to improve power density, e.g., of existing and of future gearbox designs, a scheme to provide or improve gearbox cooling may be employed as an add-on feature. Embodiments of the present invention include the use of add-on cooling fin panels 36, which reduce the operating temperatures of gearbox 12, which may permit gearbox 12 to transmit more power and/or torque, and which thus may increase the power density of gearbox 12. Although cooling fins may be formed as part of a cast iron housing, cast fins typically have a low fin efficiency because the thermal conductivity of cast iron is low, e.g., compared to aluminum or copper. In addition, it may be undesirably difficult and cost prohibitive to manufacture the slender fins that are preferred using the standard casting processes used to form typical cast gearbox housings. Also, some customers prefer gearbox housings without fins. Thus, it is preferable to have add-on cooling fins so that the same gearbox housing may be used for customers who prefer gearbox housings with fins and for customers who prefer gearbox housings without fins, which may reduce the cost of the gearbox housing.

Figure 4A:
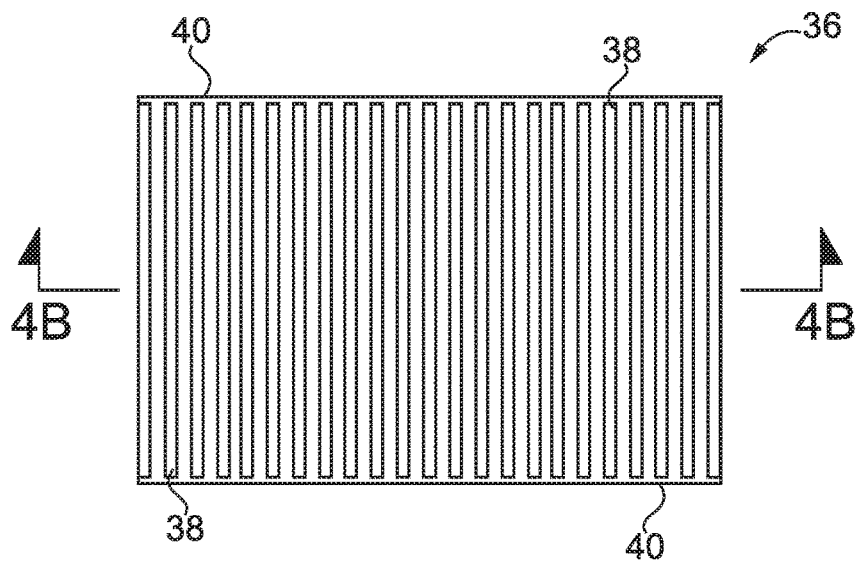
FIGS. 4A-4C schematically illustrate some aspects of a non-limiting example of a cooling fin panel for a gearbox system in accordance with an embodiment of the present invention.
Figure 4B:
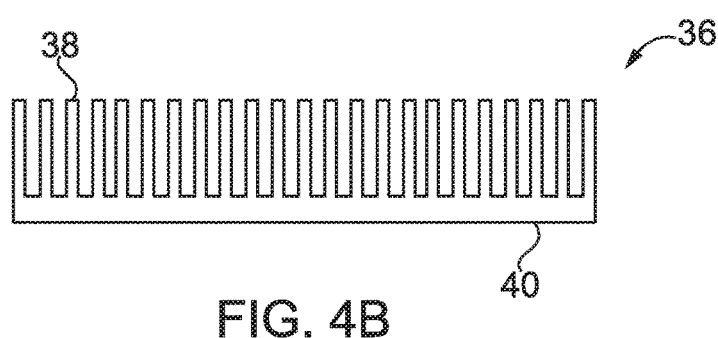
Figure 4C:
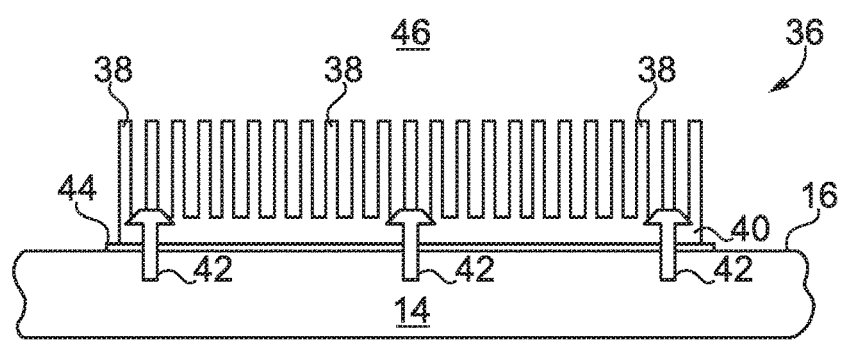

Referring also to FIGS. 4A-4C, gearbox system 10 includes a plurality of add-on cooling fin panels 36 affixed to external surface 16 of housing 14 of gearbox 12. Each cooling fin panel 36 includes a plurality of cooling fins 38 extending from a base 40. In some embodiments, base 40 is defined by the largest dimension(s) of cooling fin panels 36, in order to maximize heat transfer through cooling fin panels 36. Cooling fins 38 are of a slender configuration that is unavailable with cast gearbox housings configurations.

Cooling fin panels 36 are constructed to transfer heat from external surface 16 of housing 14 by conduction, e.g., though base 40, and to transfer heat to the environment 46 in which gearbox 12 is located by convection, e.g., via cooling fins 38.

Cooling fin panels 36 are referred to as "add-on" because they are added to gearbox 12, e.g., subsequent to the casting or other manufacture of housing 14, and in some embodiments, subsequent to the manufacture of gearbox 12; and because cooling fin panels 36 are formed to mate with housing 14 and are not formed as part of or integral to housing 14. In some embodiments, cooling fin panels 36 may be added to gearbox 12 during the manufacture of gearbox 12 or added prior to the delivery of gearbox 12 to a customer or end-user. In some embodiments, cooling fin panels 36 may be added to gearbox 12 by the customer or end-user.

Cooling fin panels 36 are in thermal engagement with external surface 16, and are thermally and mechanically coupled to external surface 16. For example, base 40 is in contact with external surface 16 of housing 14 for transferring heat from housing 14 to each cooling fin panel 36. In some embodiments, cooling fin panels 36 are constructed to match and engage the contoured shape 26 of housing 14. For example, base 40 of cooling fin panels 36 may be formed to match and complement the contour of the corresponding flat portions 28, curved portions 30, and/or curved portions 32 of housing 14, e.g., in order to maximize effective thermal contact area between cooling fin panels 36 and housing 14.

Some embodiments also employ a thermal coupling layer 44 disposed between cooling fin panels 36 and external surface 16 of housing 14. A thermal coupling layer 44 is in contact with both base 40 of each cooling fin panel 36 and with external surface 16 of housing 14. Thermal coupling layer 44 is constructed to thermally couple each respective cooling fin panel 36 with housing 14, and to enhance heat transfer from housing 14 to each respective cooling fin panel 36. In some embodiments, thermal coupling layer 44 is constructed to increase thermal contact area between external surface 16 and base 40 by filling in gaps between external surface 16 and base 40, e.g., gaps stemming from manufacturing tolerances or other manufacturing variations that otherwise prevent 100% contact engagement between base 40 and external surface 16. In some embodiments, thermal coupling layer 44 is also or alternatively constructed to increase thermal contact area between external surface 16 and base 40 by filing in and compensating for surface variations or asperities associated with the surface roughness of surface 16 and base 40. Thermal coupling layer 44 may be, for example, a thermal grease, a thermal paste, thermal contact pads and/or another layer or other structure constructed and operative to thermally couple cooling fin panels 36 with housing 14, and to enhance conductive heat transfer from housing 14 to each respective cooling fin panel 36, e.g., as described hereinabove.

Cooling fin panels 36 are formed of a metallic material. Preferably, cooling fin panels 36 are formed of a material having a thermal conductivity as high as or higher than that of the material that forms housing 14. In one non-limiting example, housing 14 is formed of cast iron. In one non-limiting example, cooling fin panels 36 are made of aluminum, e.g., 6061-T6 aluminum. In other embodiments, cooling fin panels 36 may be made of copper or a copper and/or aluminum alloy or another metal or alloy. When made of aluminum, cooling fin panels 36 may be anodized, e.g., for improved convection and for abrasion resistance to dust and debris. Cooling fin panels 36 may be made by die-casting, extrusion, and/or may be made by water jetting or other machining/material removal processes. In some embodiments, cooling fin panels 36 may be in the form of folded sheet metal structures.

Preferably, cooling fins 38 are slender, e.g., have a slender aspect ratio, with a pitch-to-height ratio between 0.05 and 0.6. More preferably, the pitch-to-height ratio is approximately 0.2. In other embodiments, cooling fins 38 may have one or more other pitch-to-height ratios. Cooling fins 38 may be rectangular, triangular, or may have another shape such as a pin or cylindrical shape. Cooling fins 38 may be, for example, smooth, or serrated.

In some embodiments, cooling fin panels 36 are releasably attached to housing 14 of gearbox 12, in particular, to external surface 16 of housing 14. In one form, attachment features 42 may be constructed to affix cooling panels 36 to housing 14 of gearbox 12. In other embodiments, attachment features 42 may be constructed to releasably affix cooling fin panels 36 to housing 14 of gearbox 12. For example, in some embodiments, cooling fin panels 36 may be attached to housing 14 via the use of attachment features 42 in the form of fasteners such as screws. In some embodiments, the fasteners may be unscrewed or otherwise uninstalled, allowing the removal of cooling fin panels 36 from gearbox 12. In some embodiments, the fasteners or other attachment features 42 may be reusable.

Figure 5:
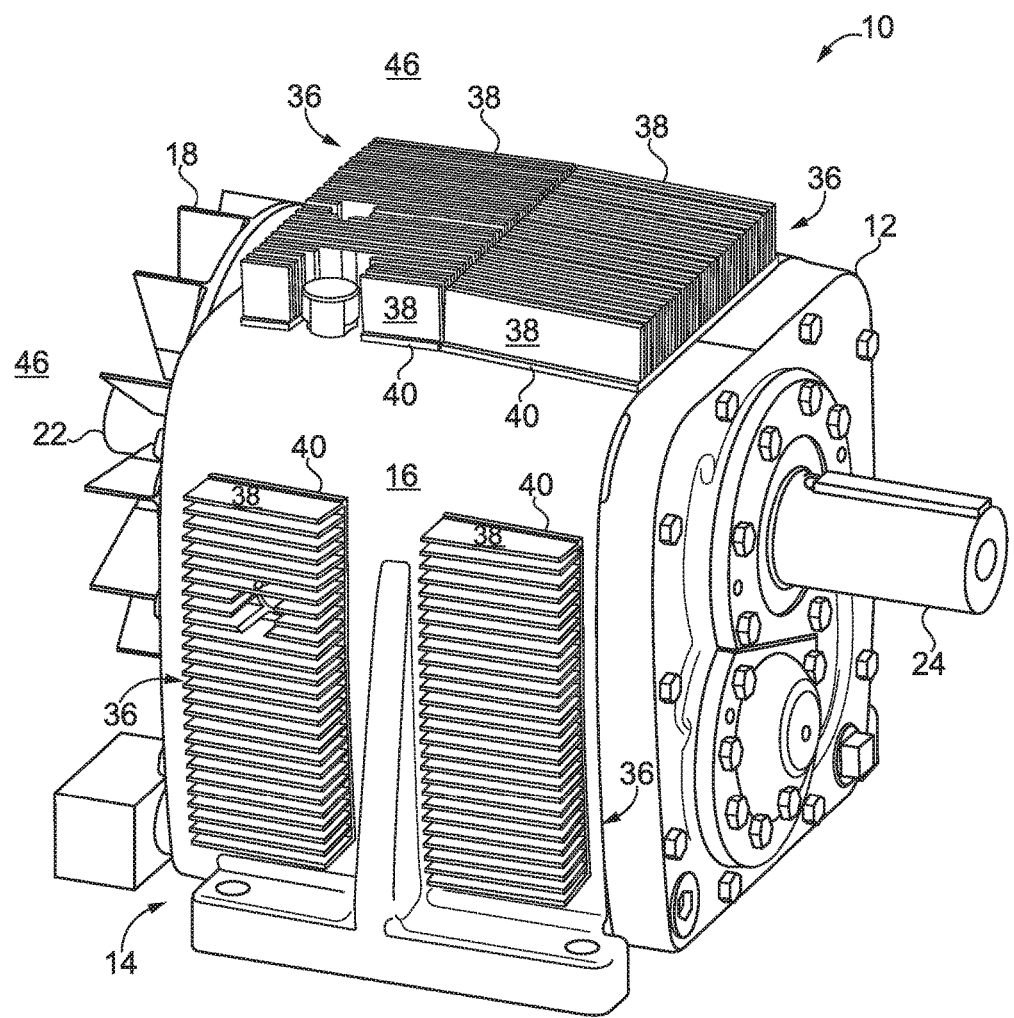
FIG. 5 illustrates some aspects of a non-limiting example of a gearbox system in accordance with an embodiment of the present invention.
Figure 6:
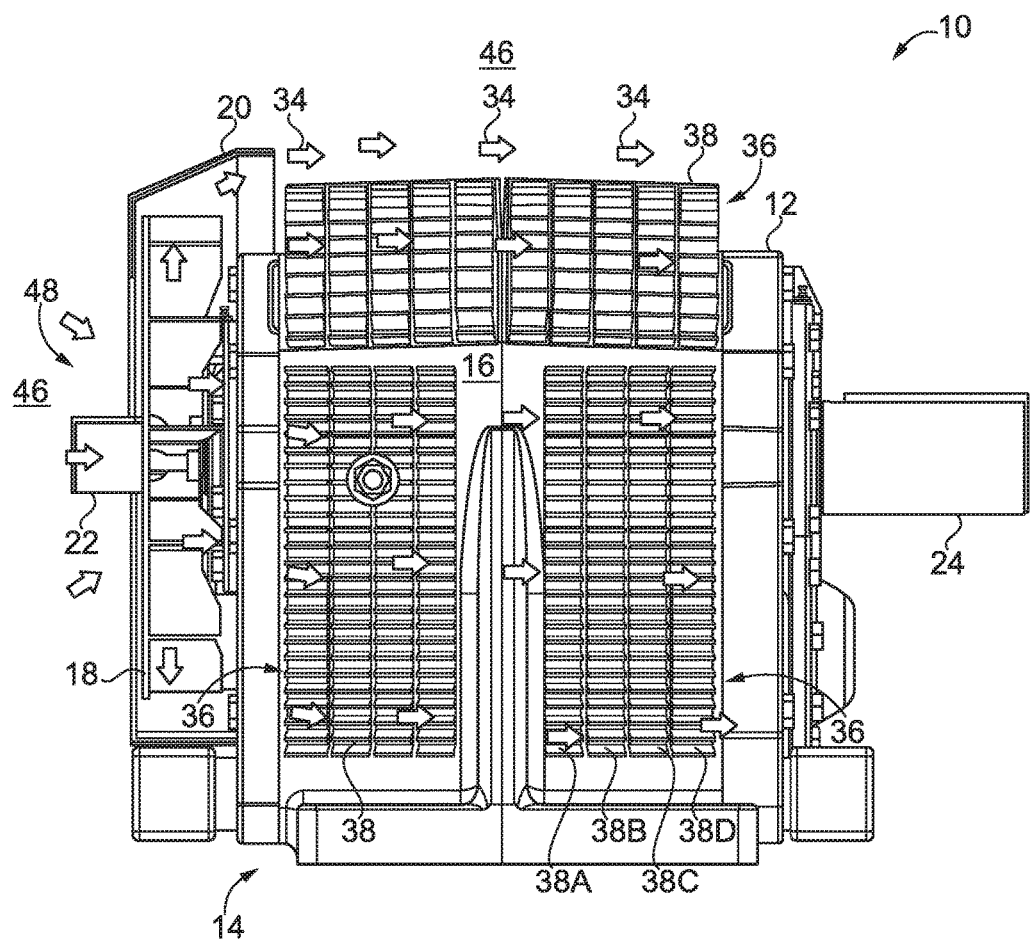
FIG. 6 illustrates some aspects of a non-limiting example of a gearbox system in accordance with an embodiment of the present invention.
Figure 7:
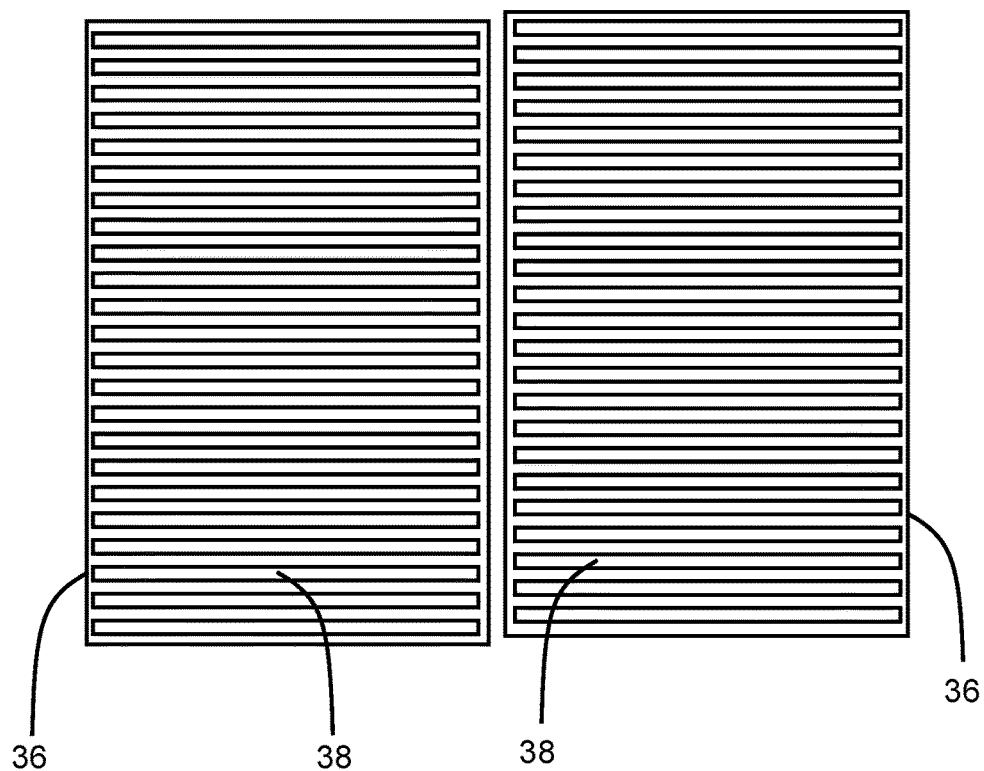
FIG. 7 illustrates some aspects of a non-limiting example of an embodiment of the present invention illustrating staggered cooling fins.

Referring also to FIGS. 5 and 6, in some embodiments, cooling fins 38 of cooling fin panels 36 may be continuous from one side or end of each cooling fin panel 36 to the other, as illustrated in FIG. 5. In other embodiments or may be segmented, e.g., each row of fins being subdivided or partitioned into a plurality of fin segments, for instance, four fin segments 38A, 38B, 38C and 38D per fin row as illustrated in FIG. 6. The fin segments 38 can also be staggered, i.e., the fin segments 38 may be shifted slightly up or down during mounting so that the fins of one fin segment line up with the gaps in another fin segment (as shown in FIG. 7). During the operation of gearbox system 10, fan or impeller 18 is rotated by shaft 22, and draws in air from the environment 46 in which gearbox 12 is located, and generates cooling airflow 34. The air is drawn into, for example, an opening or inlet 48 in shroud 20. Shroud 20 directs cooling airflow over and/or through the cooling fins 38 of cooling fin panels 36, extracting heat from gearbox 12 via convection. In some embodiments, cooling fins 38 maybe shaped to enhance airflow over and/or through cooling fins 38. Some embodiments may not include a fan or impeller 18, in which case, the cooling fins 38 may be shaped to promote natural convection.

Embodiments of the present invention include a gearbox system, comprising: a gearbox having a housing, wherein the housing includes a surface; an add-on cooling fin panel in thermal engagement with the surface, wherein the cooling fin panel includes a plurality of cooling fins; and an attachment feature constructed to affix the cooling fin panel to the gearbox, wherein the cooling fin panel is constructed to transfer heat from the surface to the cooling fin panel by conduction; and wherein the cooling fin panel is configured to transfer heat to an environment in which the gearbox is located by convection.

In a refinement, the surface has a contoured shape; and wherein the cooling fin panel is constructed to match and engage the contoured shape.

In another refinement, the cooling fin panel includes a plurality of cooling fins.

In yet another refinement, the gearbox system further comprises a thermal coupling layer disposed between the surface and the cooling fin panel.

In still another refinement, the thermal coupling layer is a thermal grease or a thermal paste.

In yet still another embodiment, the attachment feature is a fastener constructed to affix the cooling fin panel to the housing.

In a further embodiment, the cooling fin panel is formed of aluminum.

In a yet further refinement, the aluminum is anodized.

In a still further refinement, the cooling fins have a pitch-to-height ratio in the range of 0.05 and 0.6.

In a yet still further refinement, the cooling fins are segmented.

In another refinement, the cooling fins are staggered.

Embodiments of the present invention include a gearbox system, comprising: a reducing gearbox having a housing and a shaft extending from the housing, wherein the housing includes a surface; a fan or impeller coupled to the shaft and constructed to generate a cooling airflow; an add-on cooling fin panel in thermal engagement with the surface, wherein the cooling fin panel includes a plurality of cooling fins; an attachment feature constructed to affix the cooling fin panel to the gearbox; and a shroud constructed to direct the cooling airflow from the fan or impeller over and/or through the plurality of cooling fins, wherein the cooling fin panel is constructed to transfer heat from the surface to the cooling fin panel by conduction; and wherein the cooling fin panel is configured to transfer heat to an environment in which the gearbox is located by convection.

In a refinement, the surface has a contoured shape; and wherein the cooling fin panel is constructed to match and engage the contoured shape.

In another refinement, the cooling fin panel includes a plurality of cooling fins.

In yet another refinement, the gearbox system further comprises a thermal coupling layer disposed between the surface and the cooling fin panel.

In still another refinement, the thermal coupling layer is a thermal grease or a thermal paste.

In yet still another refinement, the attachment feature is a fastener constructed to affix the cooling fin panel to the housing.

In a further refinement, wherein the cooling fin panel is formed of aluminum.

In a yet further refinement, the aluminum is anodized.

In a still further refinement, the cooling fins have a pitch-to-height ratio in the range of 0.05 and 0.6.

In a yet still further refinement, the cooling fins are segmented.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A gearbox system, comprising:
   a gearbox having a housing, wherein the housing includes a surface;
   an add-on cooling fin panel in thermal engagement with the surface, wherein the cooling fin panel includes a plurality of cooling fins; and
   an attachment feature constructed to affix the cooling fin panel to the gearbox,
   wherein the cooling fin panel is constructed to transfer heat from the surface to the cooling fin panel by conduction; and
   wherein the cooling fin panel is configured to transfer heat by convection to an environment in which the gearbox is located,
   wherein the cooling fins have a pitch-to-height ratio in the range of 0.05 to 0.6.

2. A gearbox system, comprising:
   a gear reducer gearbox having a housing and a shaft extending from the housing, wherein the housing includes a continuous surface;
   a fan or impeller coupled to the shaft and constructed to generate a cooling airflow;
   an add-on cooling fin panel formed to mate with the housing in continuous thermal engagement with the continuous surface, wherein the cooling fin panel includes a plurality of cooling fins;
   an attachment feature constructed to affix the cooling fin panel to the gearbox; and
   a shroud constructed to direct the cooling airflow from the fan or impeller over and/or through the plurality of cooling fins,
   wherein the cooling fin panel is constructed to transfer heat from the continuous surface to the cooling fin panel by conduction;
   wherein the cooling fin panel is configured to transfer heat to an environment in which the gearbox is located by convection; and
   wherein the cooling fins have a pitch-to-height ratio in the range of 0.05 and 0.6.

3. A gearbox system, comprising:
   a gearbox having a housing, wherein the housing includes a continuous surface;
   an add-on cooling fin panel formed to mate with the housing in continuous thermal engagement with the continuous surface, wherein the cooling fin panel includes a plurality of cooling fins; and
   an attachment feature constructed to affix the cooling fin panel to the gearbox,
   wherein the cooling fin panel is constructed to transfer heat from the continuous surface to the cooling fin panel by conduction; and
   wherein the cooling fin panel is configured to transfer heat to an environment in which the gearbox is located by convection wherein the cooling fins have a pitch-to-height ratio in the range of 0.05 and 0.6.

4. The gearbox system of claim 3, wherein the add-on cooling fin panel is not a gearbox housing cover.

5. The gearbox system of claim 3, wherein the continuous surface has a contoured shape; and wherein the cooling fin panel is constructed to match and engage the contoured shape.

6. The gearbox system of claim 3, further comprising a thermal coupling layer disposed between the continuous surface and the cooling fin panel.

7. The gearbox system of claim 6, wherein the thermal coupling layer is a thermal grease or a thermal paste.

8. The gearbox system of claim 3, wherein the attachment feature is a fastener constructed to affix the cooling fin panel to the housing.

9. The gearbox system of claim 3, wherein the cooling fin panel is formed of aluminum.

10. The gearbox system of claim 9, wherein the aluminum is anodized.

11. The gearbox system of claim 3, wherein the cooling fins are segmented.

12. A gearbox system, comprising:
 a gear reducer gearbox having a housing and a shaft extending from the housing, wherein the housing includes a continuous surface;
 a fan or impeller coupled to the shaft and constructed to generate a cooling airflow;
 an add-on cooling fin panel formed to mate with the housing in continuous thermal engagement with the continuous surface, wherein the cooling fin panel includes a plurality of cooling fins;
 an attachment feature constructed to affix the cooling fin panel to the gearbox; and
 a shroud constructed to direct the cooling airflow from the fan or impeller over and/or through the plurality of cooling fins,
 wherein the cooling fin panel is constructed to transfer heat from the continuous surface to the cooling fin panel by conduction;
 wherein the cooling fin panel is configured to transfer heat to an environment in which the gearbox is located by convection;
 wherein the continuous surface has a contoured shape; and
 wherein the cooling fin panel is constructed to match and engage the contoured shape.

13. The gearbox system of claim 12, further comprising a thermal coupling layer disposed between the continuous surface and the cooling fin panel.

14. The gearbox system of claim 13, wherein the thermal coupling layer is a thermal grease or a thermal paste.

15. The gearbox system of claim 12, wherein the attachment feature is a fastener constructed to affix the cooling fin panel to the housing.

16. The gearbox system of claim 12, wherein the cooling fin panel is formed of aluminum.

17. The gearbox system of claim 16, wherein the aluminum is anodized.

18. The gearbox system of claim 12, wherein the cooling fins are segmented.

19. The gearbox system of claim 12, wherein the cooling fins are staggered.

* * * * *